(12) United States Patent
Chen et al.

(10) Patent No.: US 12,440,337 B2
(45) Date of Patent: Oct. 14, 2025

(54) ADAPTER AND SURGICAL AUXILIARY SYSTEM

(71) Applicant: ROBGENIX MEDICAL PTE. LTD., Singapore (SG)

(72) Inventors: Hao Chen, Shanghai (CN); Cunwang Ge, Shanghai (CN); Gang Wu, Shanghai (CN); Xueting Wei, Shanghai (CN)

(73) Assignee: ROBGENIX MEDICAL PTE. LTD., Singapore (SG)

( * ) Notice: Subject to any disclaimer, the term of this patent is extended or adjusted under 35 U.S.C. 154(b) by 0 days.

(21) Appl. No.: 19/050,974

(22) Filed: Feb. 11, 2025

(65) Prior Publication Data

US 2025/0228667 A1    Jul. 17, 2025

Related U.S. Application Data

(63) Continuation of application No. PCT/CN2024/140578, filed on Dec. 19, 2024.

(30) Foreign Application Priority Data

Dec. 20, 2023    (CN) .......................... 202311772768.6

(51) Int. Cl.
A61F 2/24    (2006.01)
(52) U.S. Cl.
CPC ............ *A61F 2/2466* (2013.01); *A61F 2/246* (2013.01)
(58) Field of Classification Search
CPC . A61F 2/24; A61F 2/2466; A61F 2/48; A61B 1/313; A61B 2017/00243; A61B 2017/0237; A61B 18/1482
See application file for complete search history.

(56) References Cited

U.S. PATENT DOCUMENTS

| | | | |
|---|---|---|---|
| 6,042,607 A * | 3/2000 | Williamson, IV .... | A61F 2/2427 606/151 |
| 11,399,867 B2 * | 8/2022 | Azar ..................... | A61F 2/2427 |
| 2021/0220983 A1 | 7/2021 | Schwamb | |

FOREIGN PATENT DOCUMENTS

| | | | | |
|---|---|---|---|---|
| CN | 104984460 A | | 10/2015 | |
| CN | 108261256 A | * | 7/2018 | ............... A61F 2/01 |

(Continued)

OTHER PUBLICATIONS

Written Opinion and International Search Report mailed Apr. 2, 2025 in International Application No. PCT/CN20224/140578, with English translation, 15 pages.

*Primary Examiner* — Bobby Rushing, Jr.
(74) *Attorney, Agent, or Firm* — Nixon & Vanderhye P.C.

(57) ABSTRACT

The present disclosure relates to an adapter and a surgical assistance system. The adapter includes a base, a first drive assembly and a second drive assembly; the base includes a bracket and a sun gear rotatably provided on the bracket, where the bracket is provided with a first input shaft and a second input shaft, and the second input shaft is in transmission connection with the sun gear; the first drive assembly is rotatably provided on the bracket and in transmission connection with the first input shaft, where the first drive assembly includes a planet carrier on which a planet gear is provided; and the second drive assembly is provided on the planet carrier and in transmission connection with the sun gear via the planet gear, where when the second drive assembly rotates with the planet carrier, the planet gear moves along a peripheral surface of the sun gear under the drive of the planet carrier. As the first drive assembly rotates, the second drive assembly can continuously rotate together with the planet gear on the first drive assembly, thereby expanding the clinical application range of the adapter.

13 Claims, 10 Drawing Sheets

(56) References Cited

FOREIGN PATENT DOCUMENTS

| CN | 113598947 A | 11/2021 | | |
|---|---|---|---|---|
| CN | 215780871 U | 2/2022 | | |
| CN | 114404108 A | 4/2022 | | |
| CN | 116262079 A | * | 6/2023 | ........... A61F 2/2427 |
| CN | 219109851 U | 6/2023 | | |

* cited by examiner

ADAPTER AND SURGICAL AUXILIARY SYSTEM

CROSS-REFERENCE TO RELATED APPLICATIONS

This application is a continuation of International Application No. PCT/CN2024/140578 filed Dec. 19, 2024 which designated the U.S. and claims priority to CN patent application No. 202311772768.6 filed Dec. 20, 2023, the entire contents of each of which are hereby incorporated by reference.

TECHNICAL FIELD

The present disclosure relates to the technical field of medical devices, and particularly to an adapter and a surgical assistance system.

BACKGROUND

Currently, mitral regurgitation is typically treated by minimally invasive surgery, particularly, a valve repair device is delivered to a mitral valve of a patient by a sheath system and is operated remotely in vitro to repair the diseased mitral valve, thereby treating the mitral regurgitation. The sheath system is of a multi-layered structure, which has an outer sheath configured to penetrate the right atrium through a femoral vein and then pass through an interatrial septum to enter the left atrium so as to deliver the valve repair device to the mitral valve.

The use of the sheath system requires for manual operations by a doctor, which are difficult and highly demanding in terms of technical skill and clinical experience, thereby causing a long learning curve for doctors and to some extent restricting the development of the surgical procedure or the clinical use of the devices. Moreover, during the surgical procedure, doctors mostly need to perform the surgery under the cooperation of CT (Computed Tomography) equipment, resulting in prolonged exposure of medical staff to a radiative environment, which can cause certain harm to the health of the medical staff. Therefore, it is necessary to provide a sheath adapter by which the sheath system can be remotely operated to improve the working environment for the medical staff and shorten the learning curve for doctors.

In the prior art, a sheath adapter includes a rotating frame, a handle drive assembly and a sheath drive assembly; the handle drive assembly includes a first transmission shaft which is in transmission connection with and configured to rotate the rotating frame; the sheath drive assembly includes a second transmission shaft having one end in transmission connection with and configured to rotate a knob. The second transmission shaft is provided on a side of the whole sheath adapter and a telescopic mechanism is provided between the second transmission shaft and the rotating frame, so that when the rotating frame rotates inwards away from the second transmission shaft or outwards towards the second transmission shaft, the telescopic mechanism can be extended or retracted accordingly, allowing a button connected to the sheath drive assembly to rotate synchronously with the rotating frame. However, since the telescopic mechanism has a limited telescopic stroke and cannot bypass the handle because of its rigidity, the handle is restricted to rotate within a limited angular range, which severely limits the scope of clinical applications of the sheath adapter.

SUMMARY

Therefore, it is necessary to provide an adapter and a surgical assistance system in view of the above technical problems.

An adapter includes:
- a base including a bracket and a sun gear rotatably provided on the bracket, where the bracket is provided with a first input shaft and a second input shaft, and the second input shaft is in transmission connection with the sun gear;
- a first drive assembly rotatably provided on the bracket and in transmission connection with the first input shaft, where the first drive assembly includes a planet carrier on which a planet gear is provided; and
- a second drive assembly provided on the planet carrier and in transmission connection with the sun gear via the planet gear, where when the second drive assembly rotates with the planet carrier, the planet gear moves along a peripheral surface of the sun gear under the drive of the planet carrier.

In an embodiment, the first drive assembly includes a central gear in transmission connection with the first input shaft and spaced from the sun gear in an axial direction.

In an embodiment, a rotating shaft of the sun gear is collinear with the rotating shaft of the first drive assembly.

In an embodiment, the second input shaft is in transmission connection with the sun gear through cooperation of a second bevel gear pair with a second cylindrical gear; and/or the first input shaft is in transmission connection with the first drive assembly through cooperation of a first bevel gear pair with a first cylindrical gear.

In an embodiment, each of the second input shaft, the sun gear, the second drive assembly, and the planet gear is provided in plurality, the plurality of sun gears are sequentially provided on the bracket in an axial direction, and each second drive assembly is in transmission connection with the corresponding planet gear via the corresponding sun gear.

In an embodiment, a connector is provided on a side of the second drive assembly that is adjacent to the planet carrier, the planet carrier is provided with at least one mounting position in a circumferential direction, and the second drive assembly is detachably connected to any of the at least one mounting position via the connector.

In an embodiment, the connector includes a clamping head, a pressing portion and an thrusting portion, where the clamping head has a mounting cavity, the pressing portion is movably provided in the mounting cavity, and the thrusting portion is slidably provided in the mounting cavity to drive the pressing portion, such that the connector is clamped onto the planet carrier.

In an embodiment, an axial distance adjusting member is further provided between the second drive assembly and the connector and includes a sliding portion, a sliding cavity and a first locking portion, the sliding portion is slidably provided in the sliding cavity, and the first locking portion is configured to lock the sliding portion at any position in an axial direction of the sliding cavity.

In an embodiment, the second drive assembly is in transmission connection with the planet gear via a flexible transmission member.

In an embodiment, a side of the planet carrier which faces away from the first drive assembly is provided with a carrier, which is provided with a locking member including a support portion, a second locking portion and a limiting portion; the support portion has a device receiving slot and is rotatable between a device receiving position and a device releasing position; the second locking portion is slidably provided on the support portion so as to extend into the receiving slot for locking when the support portion is at the device receiving position; the limiting portion is slidably provided on the support portion to extend into the carrier when the support portion is at the device receiving position to limit an axial movement range of the support portion.

A surgical assistance system, where the surgical assistance system includes a power device configured to drive a first input shaft and a second input shaft of the adapter separately, and the adapter of any of the above.

In an embodiment, when the first input shaft is rotated, the power device is configured to cause the rotation of the second input shaft based on a first command, so that the planet gear is prevented from rotating on its own axis.

In an embodiment, the second drive assembly includes a self-locking mechanism;

when the first input shaft rotates, the power device is configured to disconnect the transmission connection between the second input shaft and the power device based on a second command, so that the planet gear rotates the second input shaft by the transmission connection of the sun gear, while the planet gear is prevented from rotating on its own axis.

In the above adapter and surgical assistance system, the second drive assembly can cause the rotation of the knob via sequential transmission of the second input shaft, the sun gear and the planet gear so as to drive the sheath to bend, and when the sheath is bent, the first drive assembly can cause the rotation of the handle via the transmission of the first input shaft. When the handle is rotated, the bending direction of the sheath can be adjusted, thereby positioning a distal end of the sheath to directly face an atrial septum, ensuring that the sheath can smoothly enter the left atrium, so as to successfully deliver a mitral valve repair device to a mitral valve. When the first drive assembly is rotated by the first input shaft, the second drive assembly can be rotated together by the planet carrier; in this case, the planet gear in transmission connection with the second drive assembly also rotates synchronously around the sun gear under the drive of the planet carrier, so that a relative position between the planet gear and the second drive assembly remains unchanged, and hence the second drive assembly can continuously rotate along with the first drive assembly without being restricted by the planet gear, as a result, the rotation range of the handle on the first drive assembly is not limited, thereby expanding the clinical application range of the adapter.

DETAILED DESCRIPTION

Figure 1:
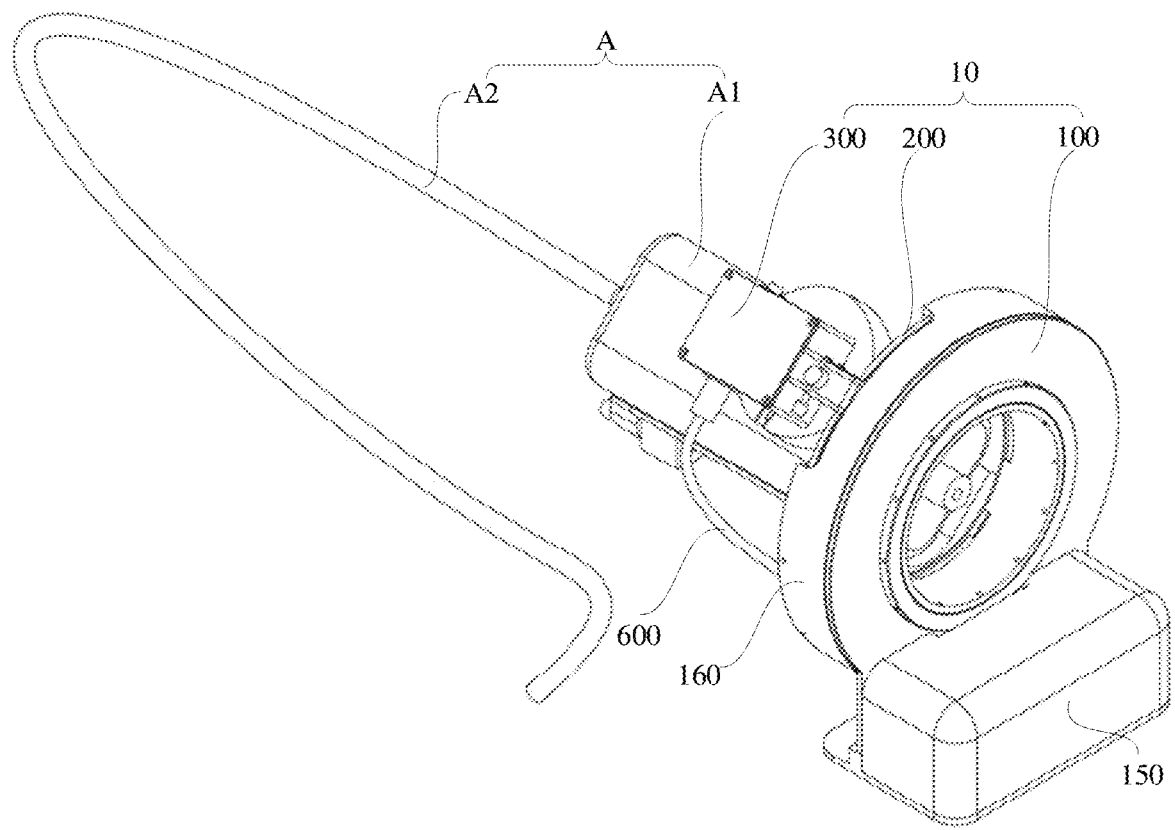
FIGS. 1, 2, and 4 are diagrams illustrating cooperation of an adapter with a sheath unit when a locking member is in a locked state according to an embodiment of the present disclosure.

To make the above objects, features, and advantages of the present disclosure more apparent, a detailed description of embodiments of the present disclosure is provided below in conjunction with the accompanying drawings. In the following description, many specific details are set forth to fully understand the present disclosure. However, the present disclosure can be implemented in many ways other than those herein set forth, and similar modifications can be made by a person skilled in the art without departing from the scope of the present disclosure, therefore, the present disclosure is not limited to the specific implementation examples disclosed below.

In describing the present disclosure, it should be understood that if terms such as "center", "longitudinal", "transverse", "length", "width", "thickness", "upper", "lower", "front", "rear", "left", "right", "vertical", "horizontal", "top", "bottom", "inner", "outer", "clockwise", "counter-clockwise", "axial", "radial", "circumferential" appear, these terms indicate the orientation or positional relationship shown in the drawings for the purpose of facilitating the description of the present disclosure and simplifying the description, rather than indicating or implying that a device or an element referred to must have a particular orientation, be constructed and operated in a particular orientation, and therefore should not be interpreted as a limitation on the present disclosure.

Furthermore, if the terms such as "first" and "second" appear, these terms are used only for descriptive purposes and should not be interpreted as indicating or implying relative importance or implicitly indicating the number of technical features indicated. Thus, the features defined by "first" and "second" may explicitly or implicitly include at least one of the features. In the description of the present disclosure, if a term "a plurality of" appears, it means at least two, such as two, three, unless otherwise explicitly and specifically limited.

In the present disclosure, unless otherwise specifically stated or limited, the terms such as "mounted", "connected with", "connected to" should be construed broadly. For example, it may be a fixed connection, a detachable connection, or an integral connection, it may be a mechanical connection or an electrical connection, it may be a direct connection or indirect connection through an intermediate media, it may be an interconnection between two elements, or may be an interactive relationship between the two elements, unless otherwise explicitly defined. For a person skilled in the art, the specific meaning of the above terms in the present disclosure may be understood according to specific situations.

In the present disclosure, unless otherwise explicitly stated or limited, if there is any description that the first feature is "on" or "under" the second feature, it may mean that the first and second features are in direct contact, or that the first and second features are in indirect contact via an intermediate media. Further, the first feature being "on", "above" and "over" the second feature may be directly above or diagonally above the second feature or merely indicate that the first feature is at a higher level than the second feature. The first feature being "under", "below" and "beneath" the second feature may be that the first feature is directly below or diagonally below the second feature, or simply that the first feature has a lower level than the second feature.

It should be noted that when an element is referred to as being "fixed to" or "provided to" another element, it can be directly on the other element or there may also be an intermediate element. When an element is referred to as being "connected" to another element, it can be directly connected to the other element or there may also be an intermediate element therebetween. As used herein, the terms "vertical", "horizontal", "upper", "lower", "left", "right" and the like, if exist, are used for illustrative purposes only and are not intended to represent the only embodiment.

As an assistance equipment commonly used in minimally invasive surgery, the delivery system is mainly used to deliver an interventional therapy device into the body of a patient for the purpose of treatment, for example, a valve repair device is delivered to the mitral valve or tricuspid valve of the patient and operated remotely in vitro to repair the diseased mitral valve or tricuspid valve; as another example, a bracket is delivered into the blood vessel of the patient to treat vascular stenosis, etc. The delivery system includes at least one sheath unit which typically includes a sheath and an operating means, such as a handle, connected to a proximal end of the sheath to control the movement of the sheath.

It should be noted that the "distal end" and the "proximal end" are only used herein to refer to relative position relationships, the "distal end" of a component refers to an end of the component that enters the patient first and/or is further from the operator than the other end during normal operation, and the "proximal end" refers to an end that enters the patient later and/or is closer to the operator than the other end.

For a delivery system for delivering a mitral valve repair device, the delivery system may include an outer sheath unit, a middle sheath unit, and an inner sheath unit. The outer sheath unit includes an outer sheath which is required to enter the right atrium along the femoral vein. After the outer sheath is bent, orientation of an end of the outer sheath is adjusted by rotating the outer sheath to ensure that the outer sheath can face the atrial septum, so that the outer sheath can penetrate the atrial septum under the guidance of the guide wire and enter the left atrium. The middle sheath unit includes a middle sheath, where the middle sheath is provided through the outer sheath and can extend from the end of the outer sheath, a extending portion of the middle sheath can bend left and right in a first plane and can also bend left and right in a second plane, and the first plane and the second plane are provided at an angle to each other. When the outer sheath reaches the left atrium, the middle sheath extends through the outer sheath into the left atrium, and during the movement of the middle sheath relative to the outer sheath, the bending direction and bending degree of the middle sheath in the first plane and the second plane according to the bending direction and bending degree of the outer sheath need to be adjusted in real time, so that the middle sheath can reach the appropriate position. The inner sheath unit includes an inner sheath that is inserted through the middle sheath and can extend from an end of the middle sheath, where an end of the inner sheath is detachably connected to the valve repair device, the inner sheath can extend through the middle sheath into the left atrium, and then the inner sheath is bent towards the position of the mitral valve and extends towards the mitral valve, thereby delivering the valve repair device to the mitral valve.

In order to improve the working environment of medical staff and shorten a learning curve for doctors, as shown in FIGS. 1-7, an embodiment of the present disclosure provides an adapter 10, which includes a base 100, a first drive assembly 200 and a second drive assembly 300; where the base 100 includes a bracket 110 and a sun gear 120 rotatably provided on the bracket 110, where the bracket 110 is provided with a first input shaft 130 and a second input shaft 140, and the second input shaft 140 is in transmission connection with the sun gear 120; the first drive assembly 200 is rotatably provided on the bracket 110 and is in transmission connection with the first input shaft 130, the first drive assembly 200 includes a planet carrier 210 on which a rotatable planet gear 310 is provided; the second drive assembly 300 is provided on the first drive assembly 200 and is in transmission connection with the sun gear 120 via a planet gear 310, where when the second drive assembly 300 rotates with the planet carrier 210, the planet gear 310 moves along a peripheral surface of the sun gear 120 under the drive of the planet carrier 210.

Figure 8:
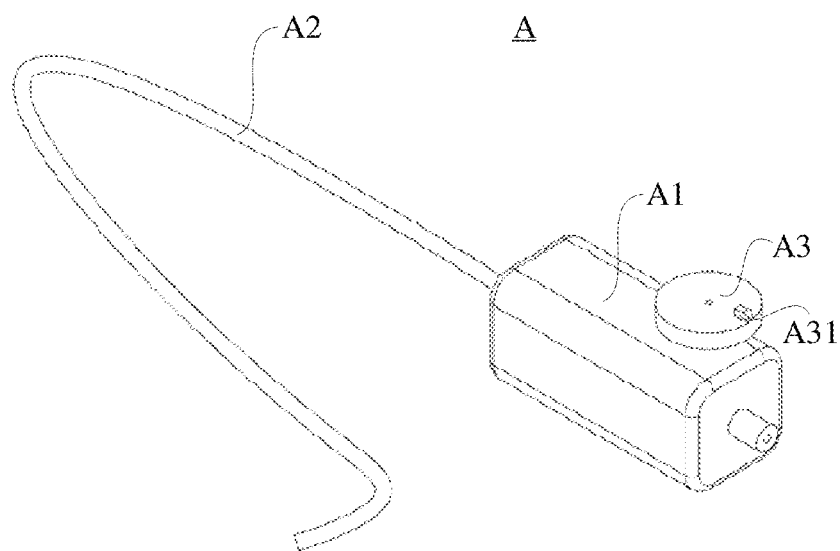
FIG. 8 is a schematic structural diagram illustrating a sheath unit according to an embodiment of the present disclosure.

The adapter 10 can be used to control a sheath unit A, and the sheath unit A in the present embodiment is described by taking the above outer sheath unit as an example. As shown in FIG. 8, the sheath unit A includes a handle A1, a sheath A2 and a knob A3, where a proximal end of the sheath A2 is provided on the handle A1, and the knob A3 is provided on the handle A1 and is used to drive the sheath A2 to bend. The first drive assembly 200 of the adapter 10 is used to cause the rotation of the handle A1, and the second drive assembly 300 is used to cause the rotation of the knob A3.

The second drive assembly 300 of the adapter 10 can cause the rotation of the knob A3 via sequential transmission of the second input shaft 140, the sun gear 120 and the planet gears 310 so as to drive the sheath A2 to bend, and when the sheath A2 is bent, the first drive assembly 200 can cause the rotation of the handle A1 via the transmission of the first input shaft 130. When the handle A1 is rotated, the bending direction of the sheath A2 can be adjusted, thereby positioning a distal end of the sheath A2 to directly face an atrial septum, ensuring that the sheath A2 can smoothly enter the left atrium, so as to successfully deliver a mitral valve repair device to a mitral valve. When the first drive assembly 200 is rotated by the first input shaft 130, the second drive assembly 300 can be rotated together by the planet carrier 210; in this case, the planet gear 310 in transmission connection with the second drive assembly 300 also rotates synchronously around the sun gear 120 under the drive of the planet carrier 210, so that a relative position between the planet gear 310 and the second drive assembly 300 remains unchanged, and hence the second drive assembly 300 can continuously rotate along with the first drive assembly 200 without being restricted by the planet gear 310, as a result, the rotation range of the handle A1 on the first drive assembly 200 is not limited, thereby expanding and the clinical application range of the adapter 10.

In some embodiments of the present disclosure, a rotating shaft of the sun gear 120 may be collinear with a rotating shaft of the first drive assembly 200. By setting the positional relationship between the sun gear 120 and the first drive assembly 200 in this way, it can ensure that when the first drive assembly 200 rotates, the planet gear 310 can move along a peripheral surface of the sun gear 120, allowing the planet gear 310 to always engage with the sun gear 120, so that the sun gear 120 can cause the rotation of the planet gear 310 under the transmission of the second input shaft 140, and thus the knob A3 can be caused to rotate by the second drive assembly 300; hence the adapter 10 has a more compact structure and a miniaturized volume.

Figure 7:
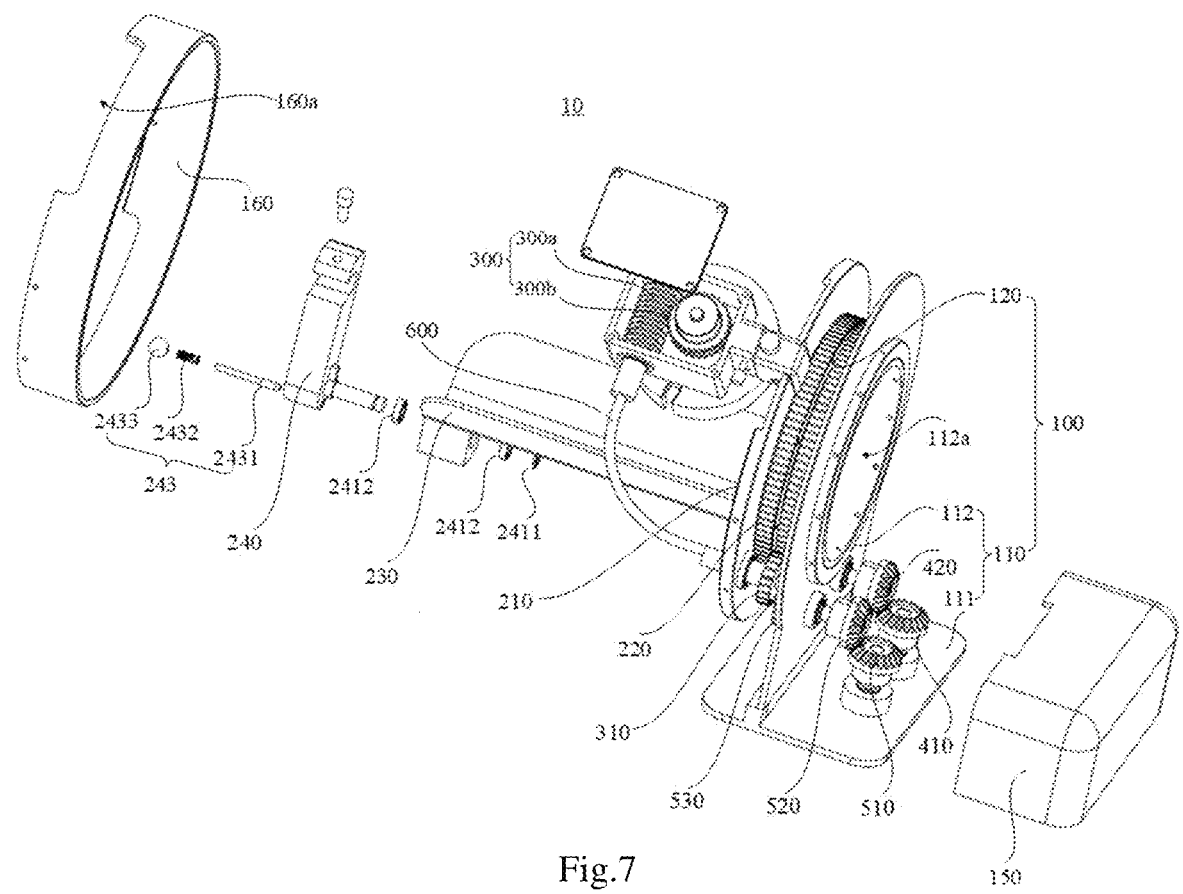
FIG. 7 is a first exploded view of an adapter according to an embodiment of the present disclosure.
Figure 9:
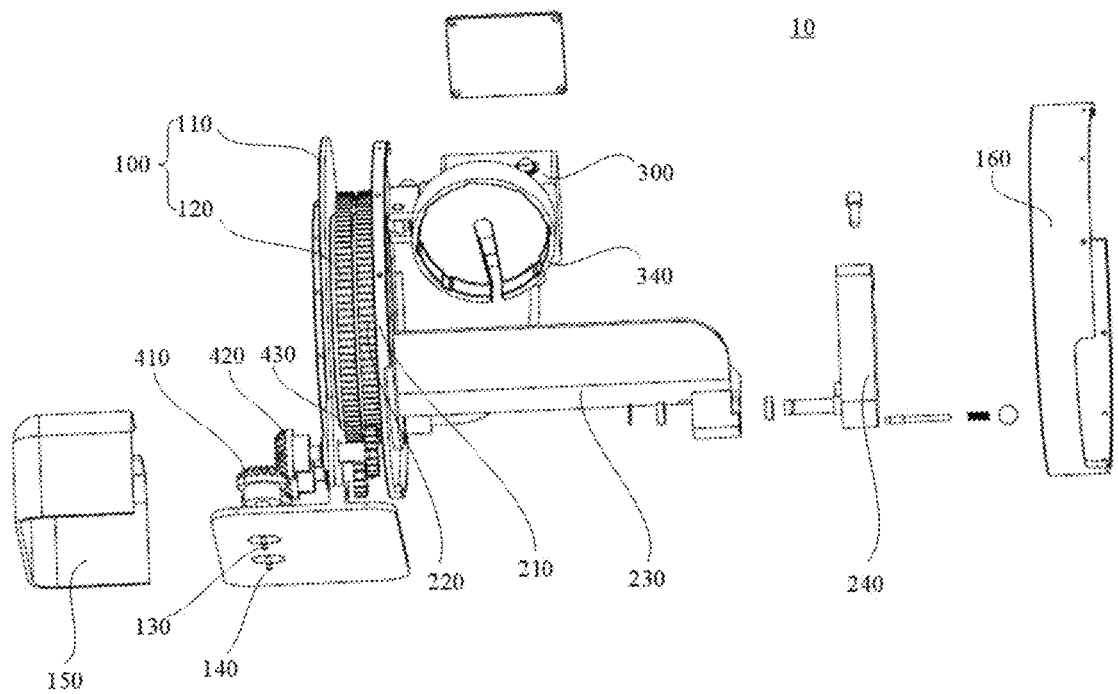
FIG. 9 is a second exploded view of an adapter according to an embodiment of the present disclosure.

Also, as shown in FIGS. 7 and 9, in order to make the adapter 10 more compact, the rotating shaft of the first drive assembly 200 may be perpendicular to the first input shaft 130, and in particular, the first input shaft 140 may be in transmission connection with the first drive assembly 200 through the cooperation of the first bevel gear pair with a first cylindrical gear 430. The first bevel gear pair includes a first bevel gear 410 and a second bevel gear 420, where the first bevel gear 410 is provided on the first input shaft 130, the second bevel gear 420 is provided on a first side of the bracket 110 away from the first drive assembly 200 and engages with the first bevel gear 410, the first cylindrical gear 430 is provided on a second side of the bracket 110 opposite to the first side and is connected to the second bevel gear 420, and the first cylindrical gear 430 engages with the first drive assembly 200. The rotation of the first input shaft 130 causes the rotation of the first bevel gear 410, as well as the rotation of the second bevel gear 420 which engages with the first bevel gear 410. The rotation of the second bevel gear 420 causes the rotation of the first cylindrical gear 430, as well as the rotation of the first drive assembly 200 which engages with the first cylindrical gear 430, in this case the first drive assembly 200 causes the rotation of the handle A1.

Also, as shown in FIG. 7, in order to make the structure of the adapter 10 more compact, the rotating shaft of the sun gear 120 is perpendicular to the second input shaft 140, and in particular, the second input shaft 140 is in transmission connection with the sun gear 120 through the cooperation of the second bevel gear pair with the second cylindrical gear 530. The second bevel gear pair includes a third bevel gear 510 and a fourth bevel gear 520, where the third bevel gear 510 is provided on the second input shaft 140, the fourth bevel gear 520 is provided on a first side of the bracket 110 away from the sun gear 120 and engages with the third bevel gear 510, a second cylindrical gear 530 is provided on a second side of the bracket 110 opposite to the first side and is connected to the fourth bevel gear 520, and the second cylindrical gear 530 engages with the sun gear 120. The rotation of the second input shaft 140 causes the rotation of the third bevel gear 510, as well as the rotation of the fourth bevel gear 520 which engages with the third bevel gear 510. The rotation of the fourth bevel gear 520 causes the rotation of the second cylindrical gear 530, as well as the sun gear 120 which engages with the second cylindrical gear 530, in this case, the planet gear 310 is rotated on its own axis and the second drive assembly 300 causes the rotation of the knob A3 under the drive of the planet gear 310.

It should be understood that the first input shaft 130 is parallel to the second input shaft 140.

In some embodiments of the present disclosure, when a plurality of knobs A3 are provided on the sheath unit A, each of the second input shaft 140, the sun gear 120, the second drive assembly 300 and the planet gears 310 is provided in plurality, where the plurality of sun gears 120 are sequentially provided on the bracket 110 in an axial direction, and each second drive assembly 300 can cause the rotation of the corresponding knob A3 by the transmission of the corresponding sun gear 120 and the corresponding planet gears 310. When a plurality of knobs A3 are provided on the sheath unit A, for example, two knobs A3 are provided on the sheath unit A of a delivery device for a tricuspid valve repair device, each of the second input shaft 140, the sun gear 120, the second drive assembly 300 and the planet gear 310 is provided in plurality, and the corresponding second drive assembly 300 can be driven by the corresponding second input shaft 140 to cause the rotation of the corresponding knobs A3, thereby expanding the present disclosure range of the adapter 10.

The plurality of second input shafts 140 may be provided side by side on a bottom plate 111 (mentioned hereinafter) of the bracket 110, and may be in transmission connection with the respective sun gears 120 via respective second bevel gear pairs and respective second cylindrical gears 530. It should be understood that the length by which each second cylindrical gear 530 protrudes from a support plate 112 of the bracket 110 is not uniform so that each second cylindrical gear 530 can engage with a corresponding sun gear 120. Similarly, the length by which the planet gears 310 of each second drive assembly 300 protrudes from the planet carrier 210 is not uniform, so that each sheath A2 can control the planet gears 310 on the assembly to engage with the corresponding sun gear 120.

Referring to FIG. 7, in some embodiments of the present disclosure, the bracket 110 of the base 100 may include a bottom plate 111, a support plate 112 vertically provided on the bottom plate 111 and having a through hole 112a, and a mounting cylinder provided at the through hole 112a of the support plate 112. The first input shaft 130 and the second input shaft 140 are rotatably provided on the bottom plate 111, the first drive assembly 200 and the sun gear 120 are rotatably sheathed on the mounting cylinder sequentially along an axial direction of the mounting cylinder, the fourth bevel gear 520 and the second cylindrical gear 530 of the second bevel gear pair, and the second bevel gear 420 and the first cylindrical gear 430 of the first bevel gear pair are rotatably provided on the support plate 112.

Further, referring to FIG. 7, the base 100 may further include a first shield 150 that covers the bottom plate 111 of the bracket 110 to protect the first and second bevel gear pairs.

Similarly, referring to FIG. 7, the base 100 may further include a second shield 160 provided on the support plate 112 of the bracket 110 to shield the planet gear 310, the sun gear 120, the central gear 210 of the first drive assembly 200 (mentioned below), and the first and second cylindrical gears 430, 530. Referring to FIG. 7, the second shield 160 has an avoidance opening 160a provided in a circumferential direction, which allows the second drive assembly 300 to rotate under the drive of the first drive assembly 200. It should be noted that an opening angle of the avoidance opening 160a is related to the rotation angle of the first drive assembly 200 (that is, the rotation angle of the handle A1), and the opening angle of the avoidance opening 160a can be set according to the surgical requirements.

In some embodiments of the present disclosure, referring to FIG. 7, a connector 320 is provided on a side of the second drive assembly 300 that is adjacent to the planet carrier 210, the planet carrier 210 is provided with at least one mounting position in a circumferential direction, and the second drive assembly 300 is detachably connected to any of the at least one mounting position via the connector 320. The mounting position of the knobs A3 on the handle A1 may vary for different types of sheath units A, and in order to enable the knobs A3 of the different types of sheath units A to be fitted to the second drive assembly 300, the mounting position of the second drive assembly 300 in the circumferential direction of the planet carrier 210 can be adjusted by means of a detachable connector 320, thereby enabling an adapter 10 to be adapted to different types of sheath units A.

Figure 10:
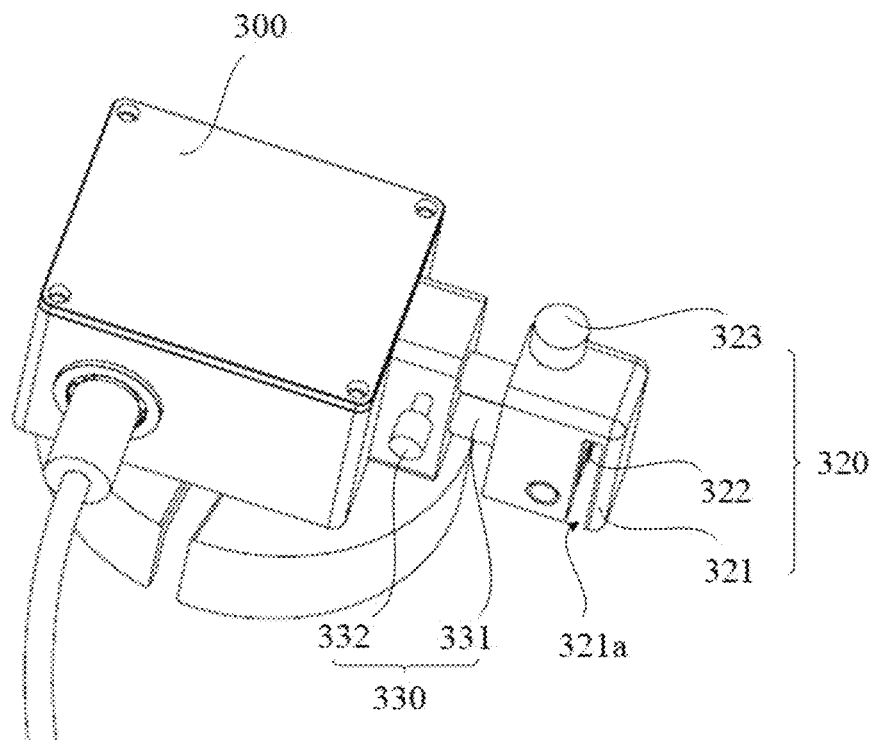
FIG. 10 is a schematic perspective structural diagram illustrating a second drive assembly according to an embodiment of the present disclosure.
Figure 11:
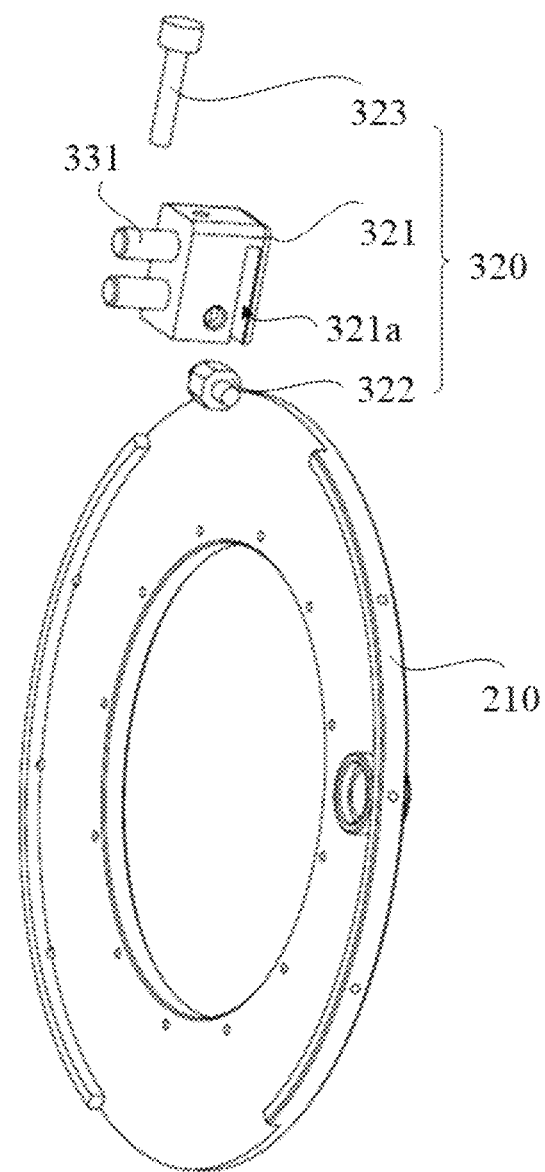
FIG. 11 is an exploded view of a clamp according to an embodiment of the present disclosure.
Figure 12:
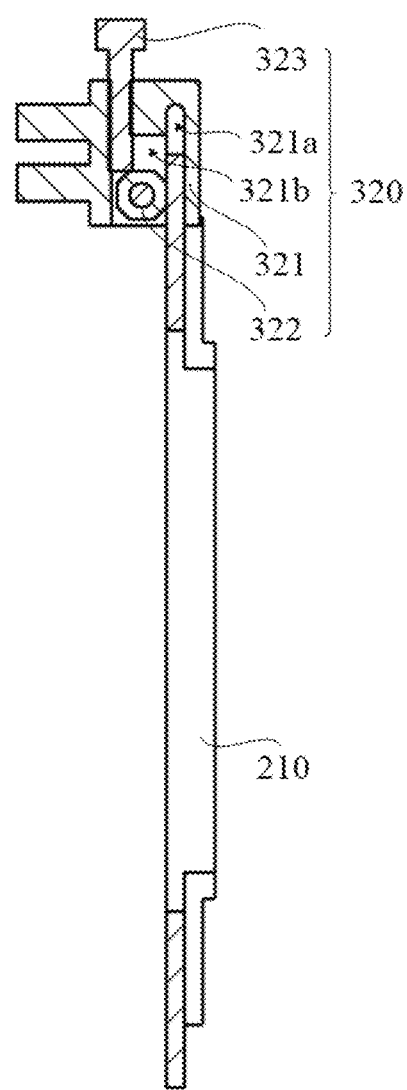
FIG. 12 is a cross-sectional view of a clamp mounted to a planet carrier according to an embodiment of the present disclosure.

Specifically, as shown in FIGS. 10 to 12, the connector 320 includes a clamping head 321, a pressing portion 322 and an thrusting portion 323, where the clamping head 321 has a mounting cavity 321a, the pressing portion 322 is movably provided in the mounting cavity 321a, and the thrusting portion 323 is slidably provided in the mounting cavity 321a and configured to cause the movement of the pressing portion 322, such that the connector 320 is clamped onto the planet carrier 210. When the second drive assembly 300 is mounted to the planet carrier 210, the second drive assembly 300 can be placed at a predetermined mounting position of the planet carrier 210 using the mounting cavity 321a of the clamping head 321, and then the thrusting portion 323 is slid toward the pressing portion 322, and the pressing portion 322 is driven by the thrusting portion 323 to move toward the planet carrier 210 until the first drive assembly 200 is tightened in the mounting cavity 321a, whereby the mounting of the second drive assembly 300 is completed. When the second drive assembly 300 needs to be disassembled, the thrusting portion 323 is slid in a direction away from the pressing portion 322, and the second drive assembly 300 can be directly detached from the planet carrier 210 after the thrusting portion 323 is removed from the pressing portion 322.

As shown in FIG. 12, the clamping head 321 further has a receiving cavity 321b communicating with the mounting cavity 321a, and the pressing portion 322 can move between the receiving cavity 321b and the mounting cavity 321a; when the pressing portion 322 is pushed by the thrusting portion 323, the pressing portion 322 can move from the receiving cavity 321b to the mounting cavity 321a to tighten the planet carrier 210.

Specifically, the thrusting portion 323 may be a threaded member, and when the pressing portion 322 tightens the planet carrier 210, the thrusting portion 323 may lock the pressing portion 322 by being threadedly connected with the clamping head 321, preventing the second drive assembly 300 from sliding along the planet carrier 210 during use of the adapter 10. The clamping head 321 has a threaded hole to which the thrusting portion 323 is threadedly connected, and the threaded hole is in communication with the receiving cavity 321b.

Specifically, as shown in FIGS. 11 and 12, the pressing portion 322 is rotatably provided on the clamping head 321. The pressing portion 322 is rotated under the push of the thrusting portion 323 to tighten the planet carrier 210. The pressing portion 322 may be a cam or an irregular or regular structure having a sloping or curved surface, such as a block pin having an octagonal cross-section as shown in FIGS. 11 and 12. It is obvious that, in other embodiments, the pressing portion 322 may be slidably provided on the clamping head 321, and a side of the pressing portion 322 which faces the thrusting portion 323 may be a sloping surface or a curved surface so that the pressing portion 322 may move towards the planet carrier 210 under the push of the thrusting portion 323.

Referring to FIG. 10, an axial distance adjusting member 330 is also provided between the second drive assembly 300 and the connector 320. By adjusting the axial distance adjusting member 330, a mounting position of the second drive assembly 300 in the axial direction of the planet carrier 210 can be adjusted, allowing the adapter 10 to be further adapted to different types of sheath units A.

Specifically, as shown in FIG. 10, the axial distance adjusting member 330 includes a sliding portion 331, a sliding cavity and a first locking portion 332, where the sliding portion 331 is slidably provided in the sliding cavity, and the first locking portion 332 is used for locking the sliding portion 331 at any position in the axial direction of the sliding cavity; as shown in FIGS. 10 and 11, a sliding portion 331 is provided on the clamp 322, and a sliding cavity is provided on the second drive assembly 300. Alternatively, the sliding portion 331 is provided on the second drive assembly 300, and the sliding cavity is provided on the clamp 322. The mounting position of the second drive assembly 300 in the axial direction of the planet carrier 210 can be adjusted by regulating a length of the sliding portion 331 inserted into the sliding cavity.

The first locking portion 332 may be a threaded member, which can tighten the sliding portion 331 against the sliding cavity when the sliding portion 331 is mounted in the sliding cavity. The first locking portion 332 of this structure is simple in structure and also facilitates locking of the sliding portion 331. The second drive assembly 300 or the clamp 322 has a threaded hole to which the first locking portion 332 is threadedly connected, and the threaded hole is in communication with the sliding cavity.

The sliding portion 331 may be a cylinder, a regular polyhedron, or of other irregular structure. It should be noted that a profile of the sliding cavity is adapted to a profile of the sliding portion 331 so as to guide the sliding movement of the sliding portion 331. The number of the sliding portions 331 may be set as required, for example, one, two or more as shown in FIG. 11. It should be noted that the number of the sliding cavities is the same as the number of the sliding portions 331, and the sliding cavities correspond to each of the sliding portions 331.

Figure 6:
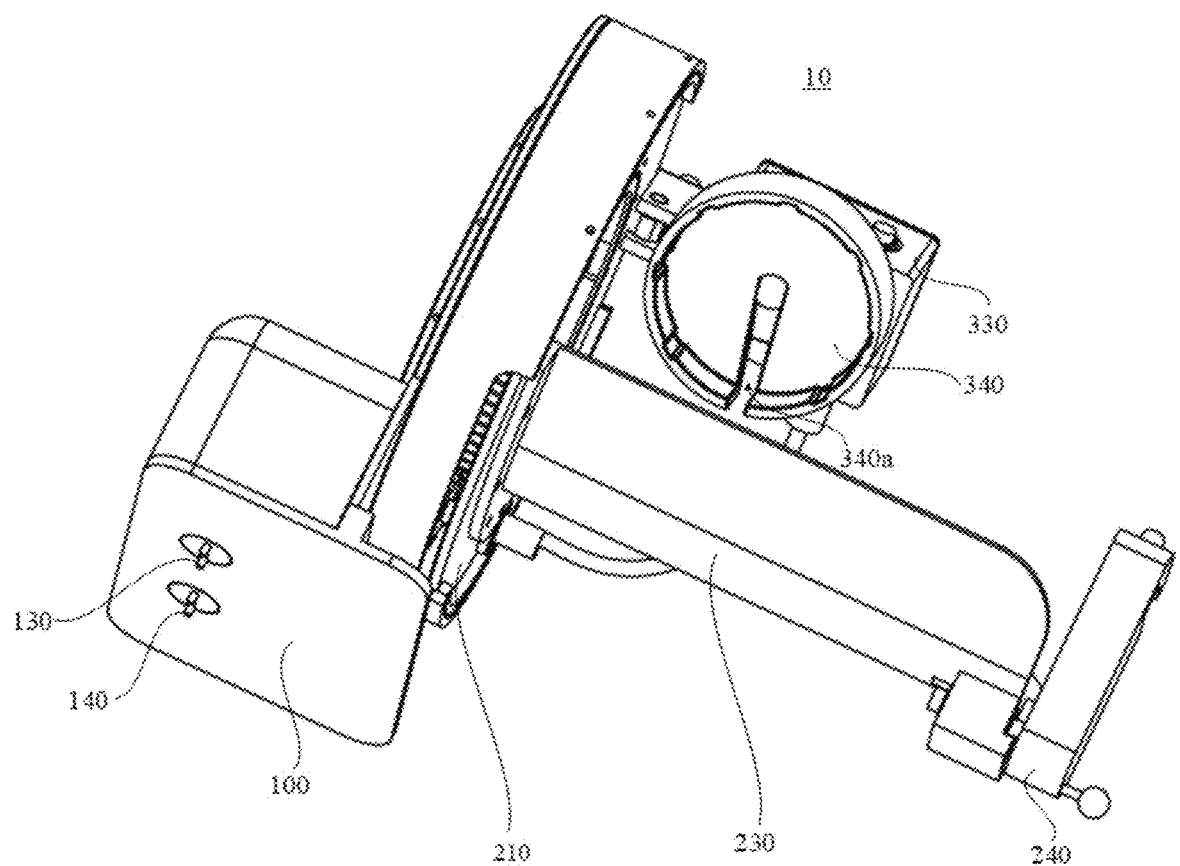

As shown in FIG. 7, the second drive assembly 300 may include a worm 300a and a worm gear 300b which engage with each other, the worm 300a is in transmission connection with a planet gear 310, and the worm gear 300b is in transmission connection with a knob A3. As shown in FIGS. 6 and 9, the second drive assembly 300 further includes a knob cap 340 connected to a rotating shaft of the worm gear 300b and used for placing the knob A3. Referring to FIG. 9, the knob cap 340 has a limiting opening 340a extended from an edge of the knob cap 340 to a central position to receive a protrusion on the knob A3. It should be understood that an inner contour of the knob cap 340 should match an outer contour of the knob A3.

Figure 2:
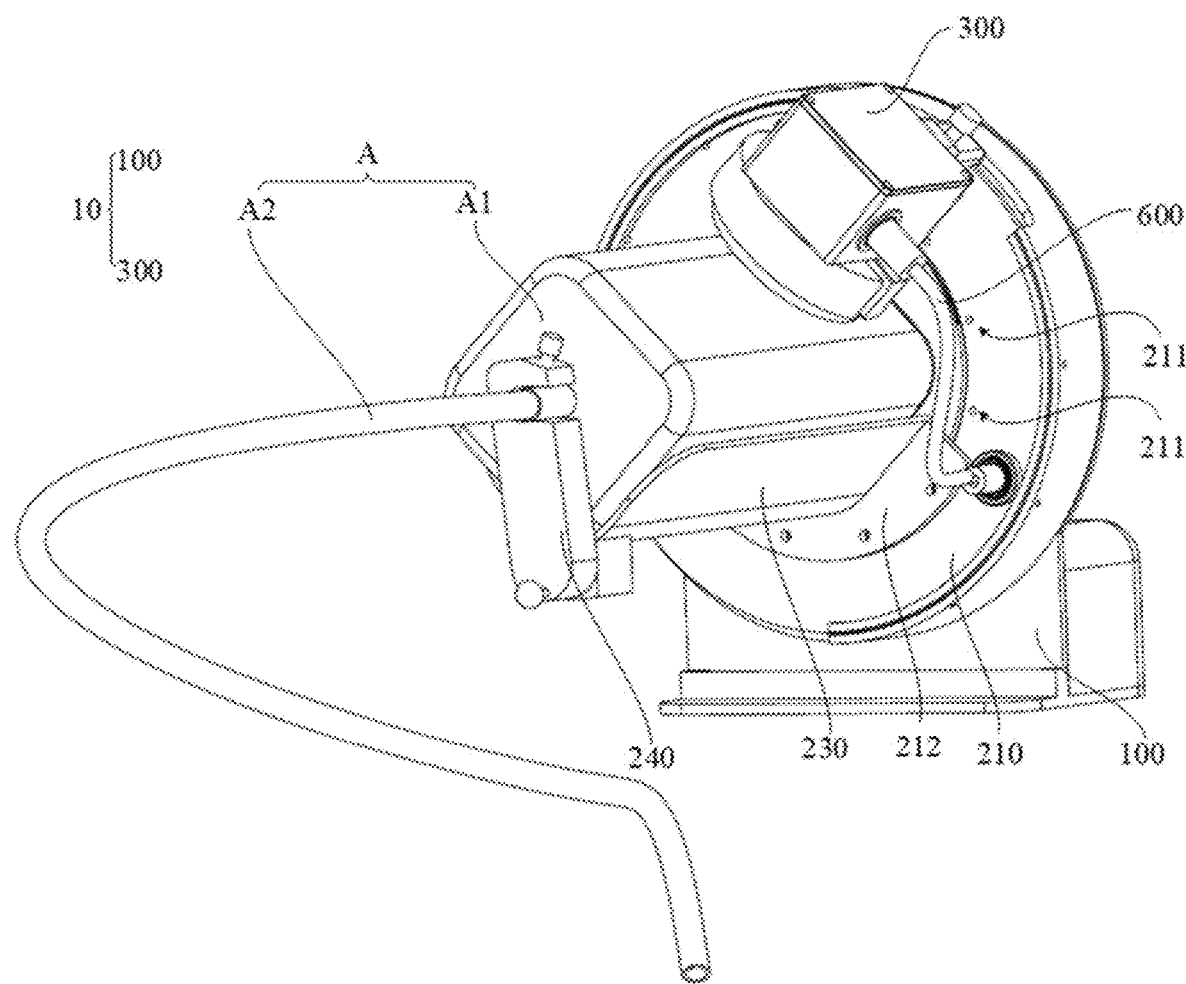

When the mounting position of the second drive assembly 300 changes in the circumferential and axial directions of the planet carrier 210, a relative position between the second drive assembly 300 and the planet gear 310 also changes. In order to ensure that the sheath A2 assembly can be normally in transmission connection with the planet gear 310, as shown in FIGS. 1 and 2, the sheath drive member 330 is in transmission connection with the planet gear 310 via a flexible transmission member 600. The flexible transmission member 600 can transmit torque and has a certain degree of flexibility so as not only to ensure a flexible connection between the sheath A2 assembly and the planet gear 310, but also to release the clamp 322 to allow the second drive assembly 300 to be removed and be suspended on a side of the adapter 10 when the sheath unit A is withdrawn from the adapter 10, thereby eliminating interference with the withdrawal operation of a handle A1. The flexible transmission member 600 may be a flexible shaft or a steel wire rope.

In some embodiments of the present disclosure, as shown in FIGS. 7 and 9, the first drive assembly 200 includes a central gear 220 in transmission connection with a first input shaft 130 and spaced from a sun gear 120 in an axial direction.

The planet carrier 210 is provided with a carrier 230 on a side which faces away from the central gear 220, and a locking member 240 is provided on the carrier 230. The carrier 230 serves to support the handle A1, and the locking member 240 serves to lock the handle A1, and the handle A1 can be firmly mounted to the adapter 10 by cooperation of the carrier 230 with the locking member 240, facilitating remote operation of the sheath unit A.

The inner contour of the carrier 230 is adapted to the outer contour of the handle A1, for example, the handle A1 is a rectangular structure as shown in FIGS. 1-4, and the cross section of the carrier 230 is "V" or "V-like" shaped as shown in FIGS. 1-4.

Referring to FIG. 2, the side of the planet carrier 210 which faces away from the central gear 220 is provided with a plurality of fitting positions 211 in a circumferential direction, and the carrier 230 can be selectively fitted to the corresponding fitting positions 211. By adjusting the mounting position of the carrier 230 on the planet carrier 210, the relative position between the rotating shaft of the worm 300a and the rotating shaft of the planet gear 310 can be adjusted, making the mounting of the sheath unit A on the adapter 10 more flexible.

Each assembly position 211 is provided with a threaded hole, and an end of a carrier of the handle A1 close to the planet carrier 210 is provided with a mounting flange 212 (see FIG. 2), and the mounting flange 212 is mounted on the corresponding threaded hole. The mounting flange 212 is mounted to the planet carrier 210 via a threaded member to facilitate mounting and dismounting of the carrier 230.

Figure 3:
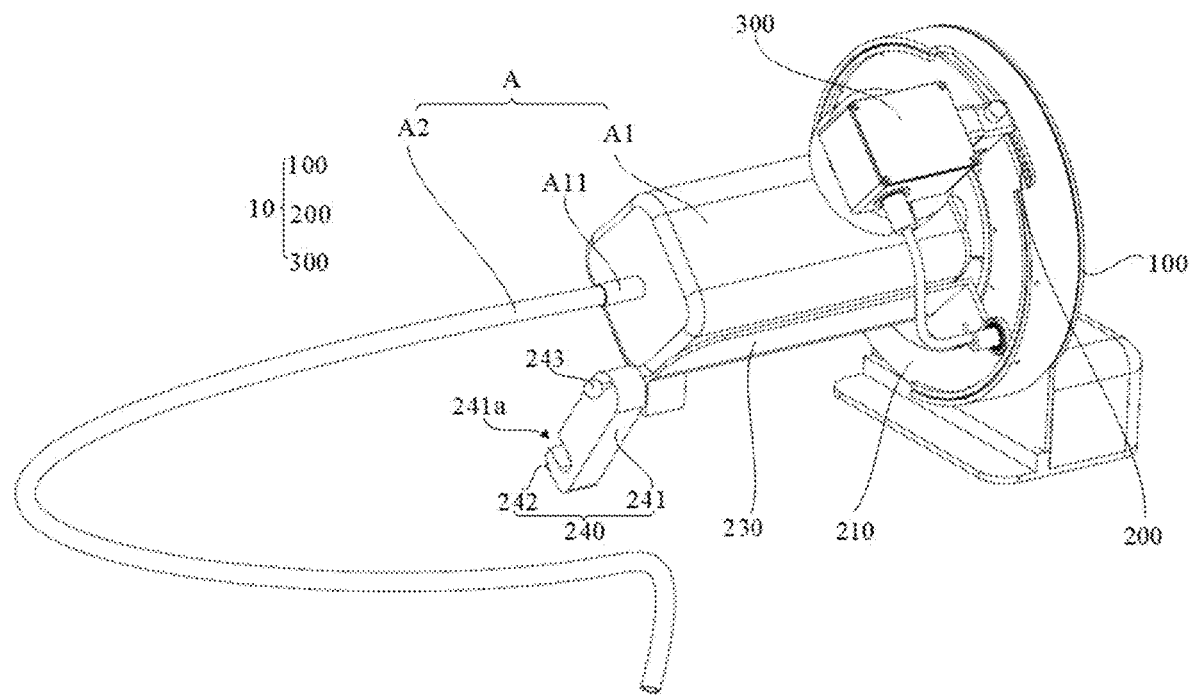
FIG. 3 is a schematic diagram illustrating an adapter cooperated with a sheath unit when a locking member is in an open position according to an embodiment of the present disclosure.
Figure 4:
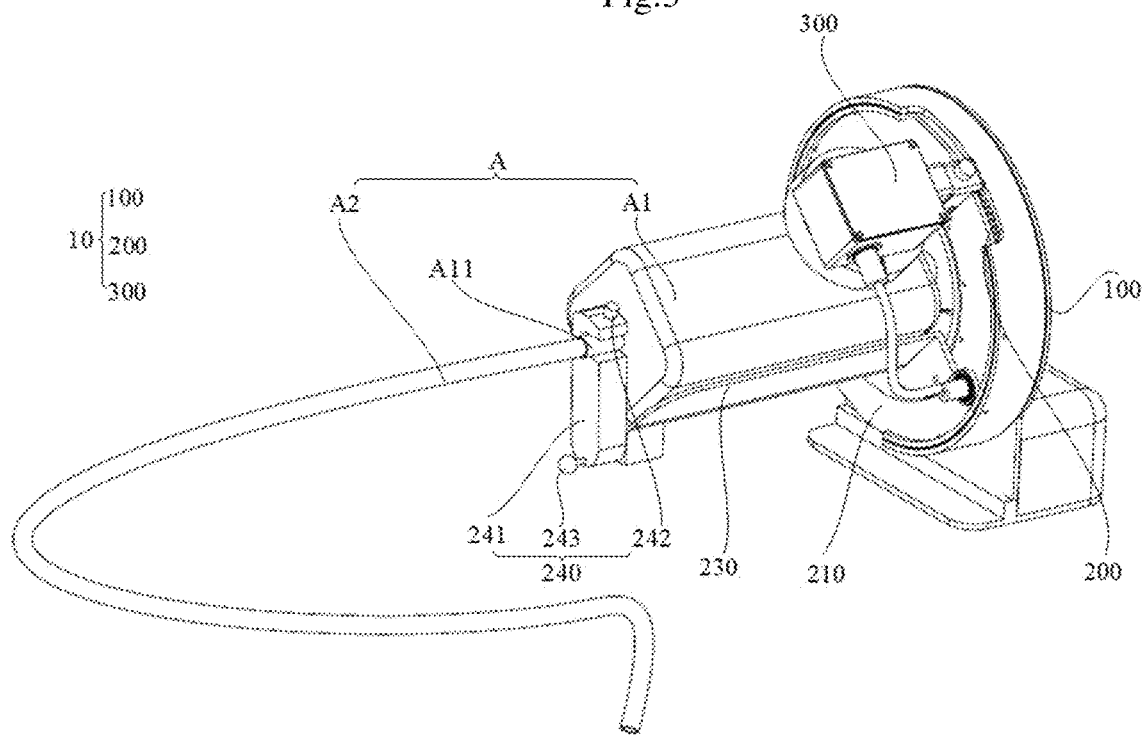
Figure 5:
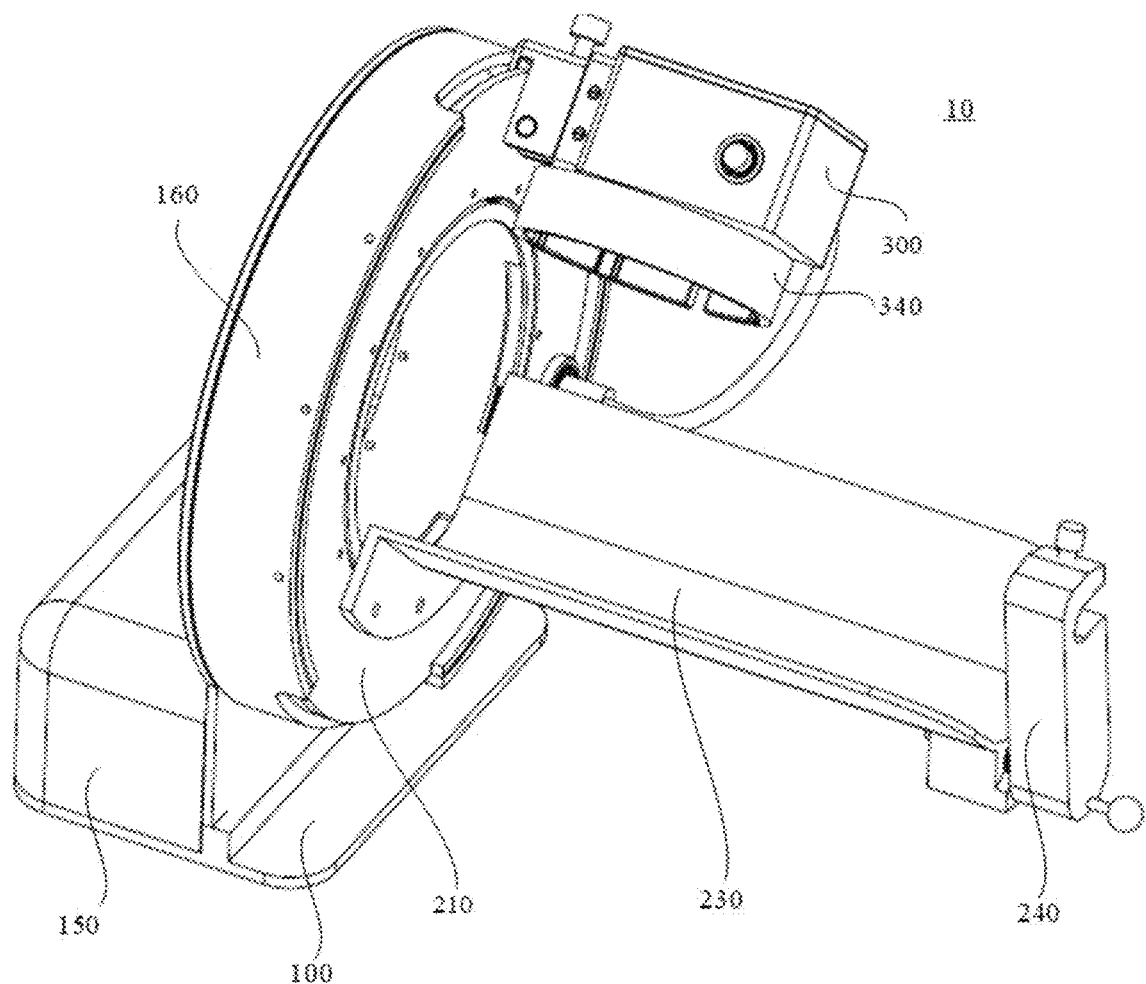
FIGS. 5 and 6 are schematic structural diagrams illustrating an adapter viewed from different orientations according to an embodiment of the present disclosure.

Referring to FIGS. 3 and 4, the locking member 240 includes a support portion 241 and a second locking portion 242. The support portion 241 has a device receiving slot 241a, and is rotatable between a device receiving position and a device releasing position; the second locking portion 242 is slidably provided to the support portion 241 to extend into the receiving slot 241a for locking when the support portion 241 is at the device receiving position. Before the handle A1 is placed, the support portion 241 is rotated in a circumferential direction to avoid interference with the handle A1 of the sheath unit A; after the handle A1 is placed on the carrier 230, the support portion 241 is rotated to the device receiving position, so that a metal rod A11 of the handle A1 is received in the receiving slot 241a of the support portion 241, and then the metal rod A11 is locked to the receiving slot 241a using the second locking portion 242, and thus the sheath unit A is completely fixed on the adapter 10. When the sheath unit A is withdrawn from a patient, locking of the metal rod A11 is first released by the second locking portion 242, and then the support portion 241 is rotated in a direction opposite to the device releasing position, that is, thereby releasing the locking of the sheath unit A.

Referring to FIG. 7, the rotating shaft of the support portion 241 may be mounted on the carrier 230 via a split washer 2411. At least one bearing 2412 may be provided between the rotating shaft of the support portion 241 and the carrier 230 to facilitate rotation of the support portion 241 around the carrier 230.

The second locking portion 242 may be a threaded member, and after the metal rod A11 of the handle A1 is received in the receiving slot 241a of the support portion 241, the second locking portion 242 can slide to tighten the metal rod A11 of the handle A1 against the receiving slot 241a by sliding. The second locking portion 242 of this structure is simple in structure and can also facilitate locking of the handle A1. The support portion 241 has a threaded hole to which the second locking portion 242 is threadedly connected to, and the threaded hole is in communication with the receiving slot 241a of the support portion 241.

Further, an end of the carrier 230 away from the planet carrier 210 has a limiting hole. As shown in FIGS. 3, 4 and 7, the locking member 240 also includes a limiting portion 243, which is slidably provided on the support portion 241 to extend into the carrier 230 when the support portion 241 is at the device receiving position, thereby limiting an axial movement range of the support portion 241. When the support portion 241 is rotated to the device receiving position, the limiting portion 243 can be inserted into the carrier 230, so that the support portion 241 can be prevented from rotating in a case where the second locking portion 242 fails to completely lock the metal rod A11 of the handle A1, and the firm mounting of the sheath unit A on the adapter 10 can be ensured. It should be noted that the rotating shaft of the limiting portion 243 is not collinear with that of the support portion 241.

Referring to FIG. 7, the limiting portion 243 includes a sliding rod 2431 slidably provided to the support portion 241 and a spring 2432 provided between the sliding rod 2431 and the support portion 241 for providing the sliding rod 2431 with a force for sliding toward the carrier 230. When the support portion 241 is in the device releasing position, the end of the sliding rod 2431 close to the carrier 230 is located in the support portion 241, and the spring 2432 is compressed; when the support portion 241 is rotated from the device releasing position to the device receiving position, the sliding rod 2431 is directed toward the carrier 230, and the sliding rod 2431 slides toward the carrier 230 under the action of the spring 2432, so that the limit to the support portion 241 in the circumferential direction can be achieved. When the sheath unit A is withdrawn from the patient, a sliding rod 2431 can simply be pulled out of the carrier 230.

As shown in FIG. 7, a toggle block 2433 is provided at an end of the sliding rod 2431 away from the carrier 230, and the toggle block 2433 is located outside the support portion 241. The provision of the toggle block 2433 facilitates an operator to toggle the sliding rod 2431 when the support portion 241 is at the device receiving position. The toggle block 2433 can be spherical, elongated, etc.

Figure 13:
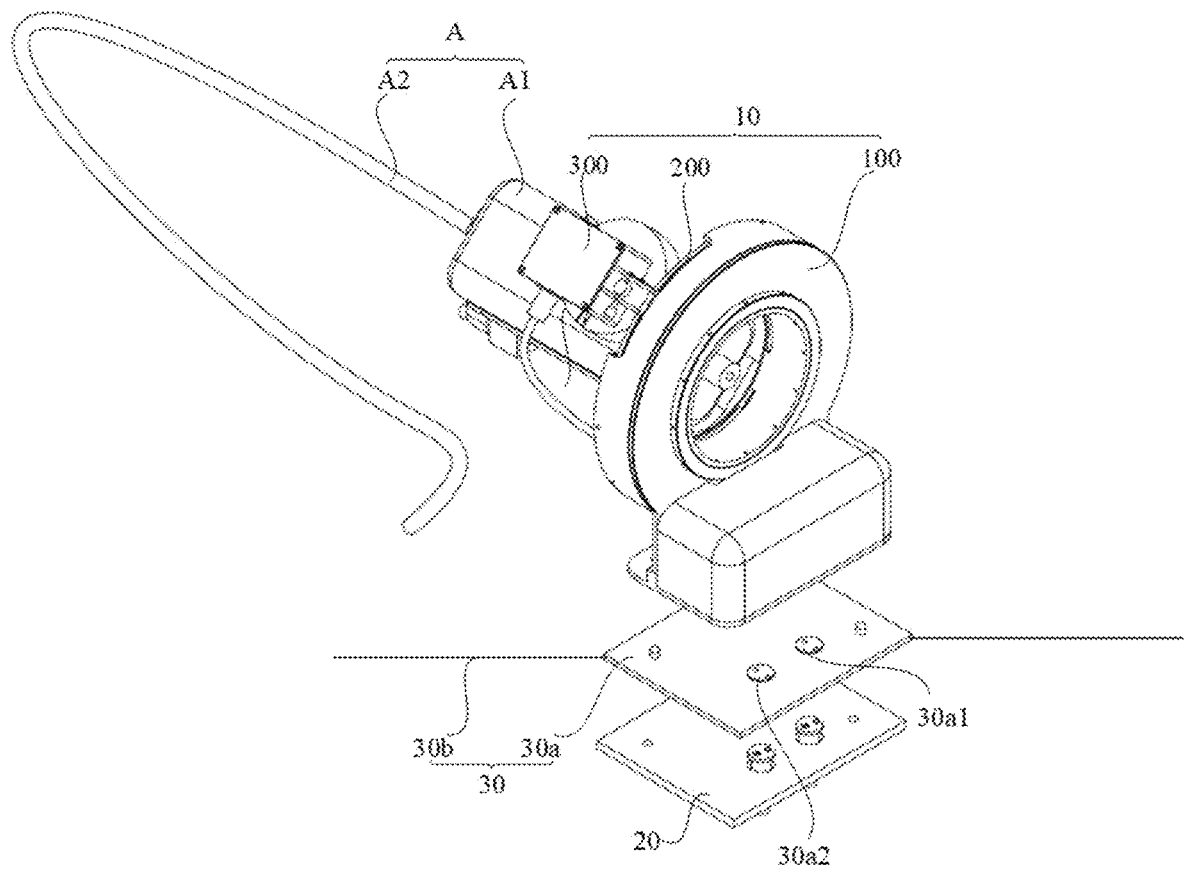
FIG. 13 is an exploded view of a surgical assistance system mounted with a sheath unit according to an embodiment of the present disclosure.

On the other hand, referring to FIG. 13, an embodiment of the present disclosure also provides a surgical assistance system including a power device 20 configured to drive a first input shaft 130 and a second input shaft 140 of the adapter 10 separately, and the adapter 10 according to any of the above.

It can be understood that, the power device 20 is configured to provide rotational power to the first input shaft 130 and the second input shaft 140 of the adapter 10, and an operator only need to remotely control the rotational speed, number of turns, direction, etc. of the first input shaft 130 and the second input shaft 140 to control the bending of the sheath A2 and the rotation of the handle A1.

In the surgical assistance system, the second drive assembly 300 of the adapter 10 can cause the rotation of the knob A3 via sequential transmission of the second input shaft 140, the sun gear 120 and the planet gears 310 so as to drive the sheath A2 to bend, and when the sheath A2 is bent, the first drive assembly 200 can cause the rotation of the handle A1 via the transmission of the first input shaft 130. When the handle A1 is rotated, the bending direction of the sheath A2 can be adjusted, thereby positioning a distal end of the sheath A2 to directly face an atrial septum, ensuring that the sheath A2 can smoothly enter the left atrium, so as to successfully deliver a mitral valve repair device to a mitral valve. When the first drive assembly 200 is rotated by the first input shaft 130, the second drive assembly 300 can be rotated together by the planet carrier 210; in this case, the planet gear 310 in transmission connection with the second drive assembly 300 also rotates synchronously around the sun gear 120 under the drive of the planet carrier 210, so that a relative position between the planet gear 310 and the second drive assembly 300 remains unchanged, and the second drive assembly 300 can continuously rotate with the first drive assembly 200 without being restricted by the planet gear 310, so that the rotation range of the handle A1 on the first drive assembly 200 is not limited, thereby expanding the clinical application range of the adapter 10.

When the handle A1 of the sheath unit A rotates, the first drive assembly 200 synchronously drives the planet gear 310 to rotate on the sun gear 120, causing the planet gear 310 to rotate automatically, and hence the second drive assembly 300 causes the rotation of the knob A3, that is, there is motion coupling between the first drive assembly 200 and the second drive assembly 300. In view of this, the present disclosure provides the following two manners of motion decoupling:

(1) When the first input shaft 130 rotates, the power device 20 is configured to cause the rotation of the second input shaft 140 based on the first command so that the planet gear 310 is prevented from rotating on its own axis. For example, when the first input shaft 130 drives the first drive assembly 200 to rotate clockwise, the planet gear 310 also rotates on the sun gear 120 in a clockwise direction, that is, the planet gear 310 revolves, and during this revolution, the planet gear 310 rotates clockwise on its own axis; at the same time, the second input shaft 140 drives the sun gear 120 to rotate clockwise, and the sun gear 120, when rotating, causes the planet gear 310 to rotate counterclockwise on its own axis, so that the planet gear 310 is prevented from rotating on its own axis, thereby preventing the knob A3 from rotating.

(2) The second drive assembly 300 includes a self-locking mechanism, and as the first input shaft 130 rotates, the power device 20 is configured to disconnect the transmission connection between the second input shaft 140 and the power device 20 based on the second command, so that the planet gear 310 causes the rotation of the second input shaft 140 by the transmission connection of the sun gear 120, while the planet gear 310 is prevented from rotating on its own axis. Since the second drive assembly 300 includes a self-locking mechanism (for example, a mechanism formed by the worm gear 300b and the worm 300a cooperating with each other), a certain torque is required for the transmission, which is greater than the torque required for transmission when the second input shaft 140 is in an unlocked state (that is, a transmission connection with the power device 20), then the torque generated by the planet gear 310 under the drive of the first drive assembly 200 is transmitted to the second input shaft 140 via the sun gear 120, rather than to the second drive assembly 300, thereby preventing the knob A3 from rotating.

A clutch mechanism may be provided between the output shaft of the power device 20 and the second input shaft 140 of the adapter 10; as the first input shaft 130 rotates, the power device 20 is configured to drive the clutch mechanism to disconnect the transmission connection between the second input shaft 140 and the power device 20 based on the second command.

Referring to FIG. 13, the surgical assistance system further includes a sterile assembly 30 in transmission connection with the power device 20 and the adapter 10 and extending in all directions to place the adapter 10 and the sheath unit A in a sterile environment. The sterile assembly 30 provides aseptic isolation for the sheath unit A, ensuring that the procedure can be performed in the sterile environment.

Specifically, referring to FIG. 13, the sterile assembly 30 may include a sterile plate 30a and a sterile protective film 30b; the sterile plate 30a is provided between the bracket 110 of the adapter 10 and the power device 20 and is provided with a first transmission shaft 30a1 and a second transmission shaft 30a2, the first transmission shaft 30a1 is in transmission connection with the first input shaft 130 and the power device 20, and the second transmission shaft 30a2 is in transmission connection with the second input shaft 140 and the power device 20; and the sterile plate 30a is provided on the sterile protective film 30b and extends in all directions.

The sterile plate 30a may be connected to the base 100 and power device 20 of the adapter 10 using snaps, threaded members, or other means.

Referring to FIG. 13, the sterile plate 30a is provided with a positioning pin 30a3, and the base 100 of the adapter 10 and the power device 20 are provided with a positioning hole 20a; or the sterile plate 30a is provided with positioning holes and the base 100 of the tube adapter and the power device 20 are provided with positioning pins. Through the cooperation of the positioning pin 30a3 with the positioning hole 20a, assembly of the sterile assembly 30, the adapter 10 and the power device 20 can be positioned so as to facilitate the transmission connection of the sterile assembly 30 with the adapter 10 and the power device 20.

Each technical feature of the above embodiments can be combined in any manner, and in order to make the description concise, not all the possible combinations of each technical feature in the above embodiments are described; however, as long as there is no contradiction between the combinations of these technical features, they should be considered as the scope of the description.

The embodiments described above represent only a few embodiments of the present disclosure and are described in more detail and are not to be construed as limiting the scope of the present disclosure. It should be noted that several variations and modifications can be made by a person skilled in the art without departing from the inventive concept, all of which belong to the protection scope of the present disclosure. Accordingly, the protection scope of the present disclosure should be based on the appended claims.

What is claimed is:

1. An adapter comprising:
  a base comprising a bracket and a sun gear rotatably provided on the bracket, the bracket being provided with a first input shaft and a second input shaft, and the second input shaft being in transmission connection with the sun gear;

a first drive assembly rotatably provided on the bracket and in transmission connection with the first input shaft, wherein the first drive assembly includes a planet carrier on which a planet gear is provided; and a second drive assembly provided on the planet carrier and in transmission connection with the sun gear via the planet gear, wherein when the second drive assembly rotates with the planet carrier, the planet gear moves along a peripheral surface of the sun gear under the drive of the planet carrier.

2. The adapter according to claim 1, wherein the first drive assembly comprises a central gear in transmission connection with the first input shaft and spaced from the sun gear in an axial direction.

3. The adapter according to claim 1, wherein a rotating shaft of the sun gear is collinear with a rotating shaft of the first drive assembly.

4. The adapter according to claim 1, wherein the second input shaft is in transmission connection with the sun gear through cooperation of a second bevel gear pair with a second cylindrical gear; and/or the first input shaft is in transmission connection with the first drive assembly through cooperation of a first bevel gear pair with a first cylindrical gear.

5. The adapter according to claim 1, wherein each of the second input shaft, the sun gear, the second drive assembly, and the planet gear is provided in plurality, the plurality of sun gears are sequentially provided on the bracket in an axial direction, and each second drive assembly is in transmission connection with the corresponding planet gear via the corresponding sun gear.

6. The adapter according to claim 1, wherein a connector is provided on a side of the second drive assembly that is adjacent to the planet carrier, the planet carrier is provided with at least one mounting position in a circumferential direction, and the second drive assembly is detachably connected to any of the at least one mounting positions via the connector.

7. The adapter according to claim 6, wherein the connector comprises a clamping head, a pressing portion and a thrusting portion, wherein the clamping head has a mounting cavity, the pressing portion is movably provided in the mounting cavity, and the thrusting portion is slidably provided in the mounting cavity to drive the pressing portion, such that the connector is clamped onto the planet carrier.

8. The adapter according to claim 6, wherein an axial distance adjusting member is further provided between the second drive assembly and the connector and comprises a sliding portion, a sliding cavity and a first locking portion, the sliding portion is slidably provided in the sliding cavity, and the first locking portion is configured to lock the sliding portion at any position in an axial direction of the sliding cavity.

9. The adaptor according to claim 1, wherein the second drive assembly is in transmission connection with the planet gear via a flexible transmission member.

10. The adapter according to claim 1, wherein a side of the planet carrier which faces away from the first drive assembly is provided with a carrier, which is provided with a locking member comprising a support portion, a second locking portion and a limiting portion; the support portion has a device receiving slot and is rotatable between a device receiving position and a device releasing position; the second locking portion is slidably provided on the support portion so as to extend into the receiving slot for locking when the support portion is at the device receiving position; the limiting portion is slidably provided on the support portion to extend into the carrier when the support portion is at the device receiving position to limit an axial movement range of the support portion.

11. A surgical assistance system, comprising a power device and an adapter according to claim 1, wherein the power device is configured to drive a first input shaft and a second input shaft of the adapter separately.

12. The surgical assistance system according to claim 11, wherein when the first input shaft is rotated, the power device is configured to cause the rotation of the second input shaft based on a first command, so that the planet gear is prevented from rotating on its own axis.

13. The surgical assistance system according to claim 11, wherein the second drive assembly comprises a self-locking mechanism;

when the first input shaft rotates, the power device is configured to disconnect the transmission connection between the second input shaft and the power device based on a second command, so that the planet gear causes the rotation of the second input shaft by the transmission connection of the sun gear, while the planet gear is prevented from rotating on its own axis.

* * * * *